(12) United States Patent
Robert et al.

(10) Patent No.: US 10,911,759 B2
(45) Date of Patent: Feb. 2, 2021

(54) METHOD AND APPARATUS FOR ENCODING AND DECODING MOTION INFORMATION

(71) Applicant: InterDigital VC Holdings, Inc., Wilmington, DE (US)

(72) Inventors: Antoine Robert, Mézières sur Couesnon (FR); Tangi Poirier, Thorigné-Fouillard (FR); Fabrice Urban, Thorigné-Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/475,345

(22) PCT Filed: Dec. 26, 2017

(86) PCT No.: PCT/EP2017/084586
§ 371 (c)(1),
(2) Date: Jul. 1, 2019

(87) PCT Pub. No.: WO2018/127442
PCT Pub. Date: Jul. 12, 2018

(65) Prior Publication Data
US 2019/0342557 A1 Nov. 7, 2019

(30) Foreign Application Priority Data
Jan. 3, 2017 (EP) ..................... 17305002

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/164* (2014.11);
(Continued)

(58) Field of Classification Search
CPC .... H04N 19/139; H04N 19/521; H04N 19/52; H04N 19/176; H04N 19/164; H04N 19/105; H04N 19/523
See application file for complete search history.

(56) References Cited

U.S. PATENT DOCUMENTS

| 2008/0186404 | A1* | 8/2008 | Bull | ..................... H04N 19/139 348/616 |
| 2010/0149422 | A1* | 6/2010 | Samuelsson | ......... H04N 19/139 348/699 |

(Continued)

FOREIGN PATENT DOCUMENTS

| WO | WO2011095260 | 8/2011 |
| WO | WO2013106336 A2 | 7/2013 |

(Continued)

OTHER PUBLICATIONS

Alshina E et al, "Description of exploration experiments on coding tools", Document: JVET-D1011_r1, 4 JVET Meeting, Chengdu, Dec. 26, 2016.

(Continued)

*Primary Examiner* — Tracy Y. Li
(74) *Attorney, Agent, or Firm* — Xiaoan Lu

(57) ABSTRACT

A Frame Rate Up-Conversion (FRUC) derivation process, based on frame rate up-conversion techniques, is developed in the reference software JEM (Joint Exploration Model) by the Joint Video Exploration Team (JVET). In one embodiment, a modified FRUC derivation process improves the performance of the current FRUC tool is provided. For example, an initial list of motion vector candidates defined in the FRUC derivation process may be reordered, and/or one or more of the ordered motion vector candidates in the defined list may be removed to improve the efficiency of the process. The reordering and/or the removal may be based on, e.g., one or more of previously determined motion vector (Continued)

candidates of one or more previously decoded blocks. In addition, the adaptive reordering mode may be signaled by the encoder to the decoder as part of the modified FRUC derivation process.

20 Claims, 6 Drawing Sheets

(51) Int. Cl.
  *H04N 19/164* (2014.01)
  *H04N 19/176* (2014.01)
  *H04N 19/52* (2014.01)
  *H04N 19/513* (2014.01)
(52) U.S. Cl.
  CPC .......... *H04N 19/176* (2014.11); *H04N 19/52* (2014.11); *H04N 19/521* (2014.11)

(56) References Cited

U.S. PATENT DOCUMENTS

| | | | |
|---|---|---|---|
| 2011/0194608 A1* | 8/2011 | Rusert | H04N 19/105 375/240.16 |
| 2012/0008688 A1* | 1/2012 | Tsai | H04N 19/52 375/240.16 |

FOREIGN PATENT DOCUMENTS

| | | |
|---|---|---|
| WO | WO2013106336 A3 | 7/2013 |
| WO | WO201318448 | 12/2013 |

OTHER PUBLICATIONS

Benjamin Bross et al, "Inter picture prediction in HEVC", High efficiency video coding (HEVC), Aug. 23, 2014, Springer International Publishing, pp. 113-140.

Thomas Guionnet et al, "3D-CE5_h: Reducing the coding cost of merge index by dynamic merge index re-allocation", Document: JCT3V-B0078, 2 JCT-3V Meeting; 102 MPEG Meeting; Changhai, Oct. 8, 2012.

Takehara H et al, "Non-CE9: Merging candidate reordering", Document: JCTVC-G181, 7 JCT-VC Meeting; 98 MPEG Meeting; Geneva, Nov. 9, 2011.

Jung J et al, "TE11: Report on experiment 3.3.b: 'Temporally oriented' set of predictors for MV-Competition", Document: JCTVC-C291, 3 JCT-VC Meeting, 94 MPEG Meeting, Guangzhou, Oct. 2, 2010.

Chen et al., "Decoder-Side Motion Vector Refinement Based on Bilateral Template Matching", Joint Video Exploration Team (JVET) of ITU-T SG 16 WP 3 and ISO/IEC JTC 1/SC 29/WG 11, JVET-D0029, 4th Meeting: Chengdu, CN, Oct. 15-21, 2016.

* cited by examiner

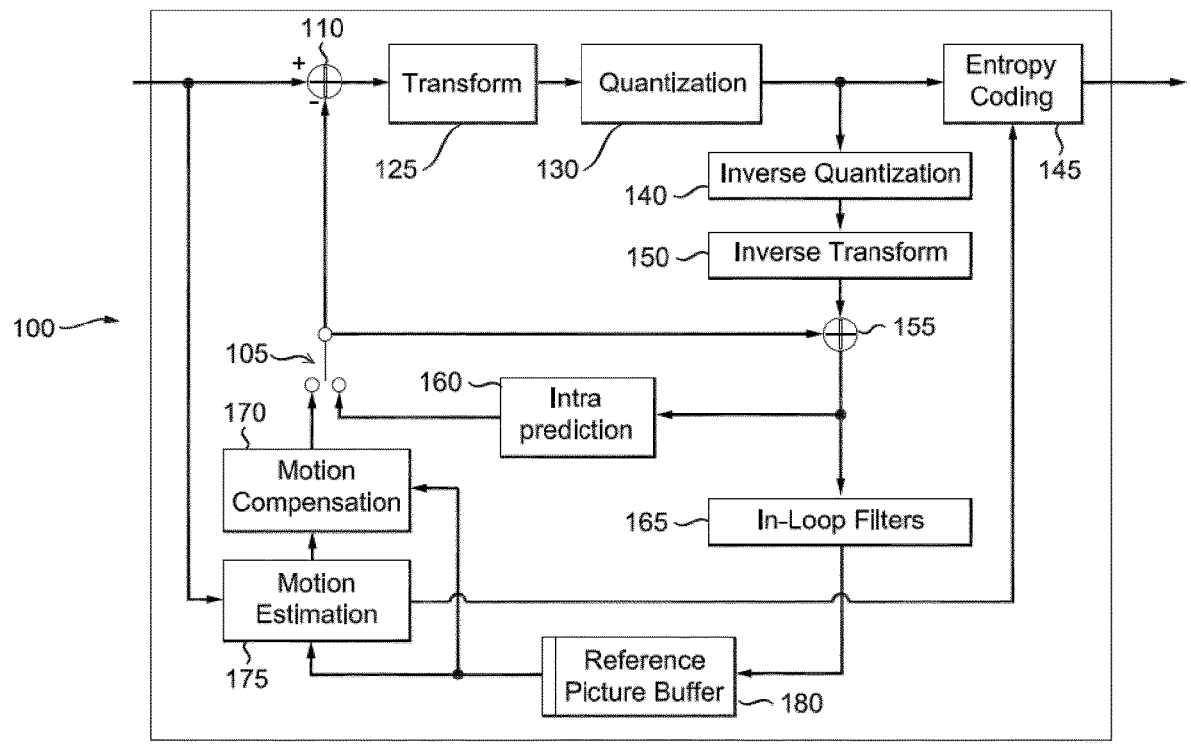
FIG. 1
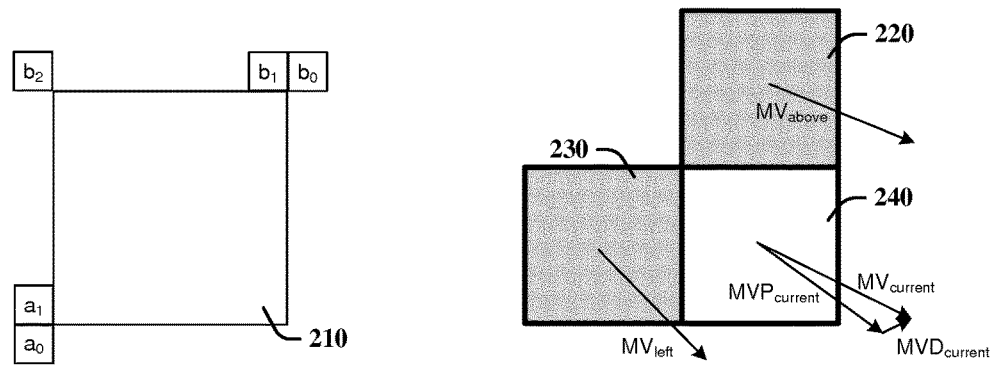
FIG. 2A  FIG. 2B

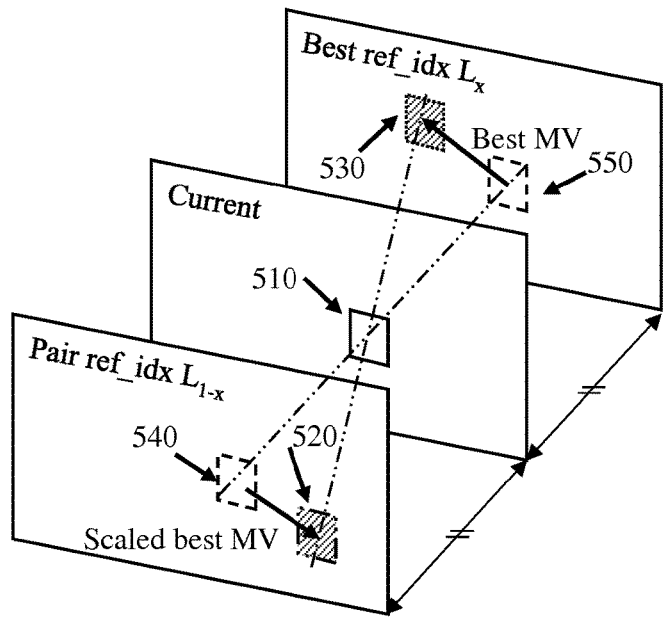
FIG. 5A
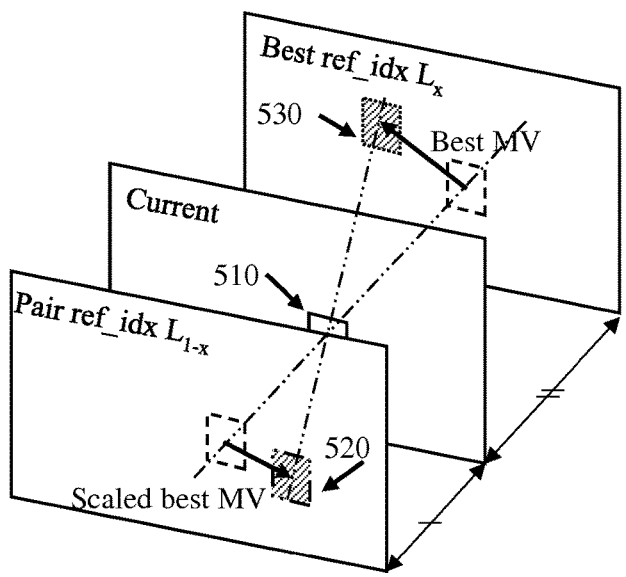 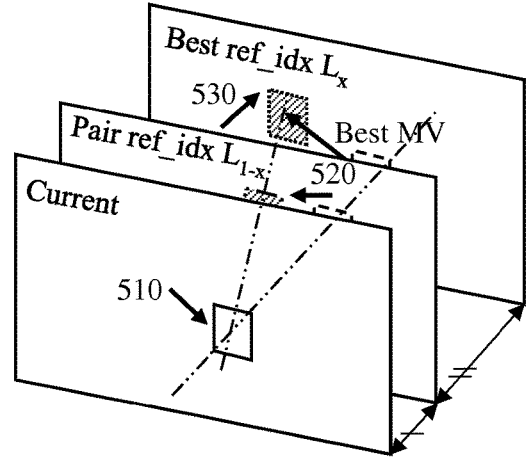
FIG. 5B                FIG. 5C (a) Diamond pattern    (b) Cross pattern

METHOD AND APPARATUS FOR ENCODING AND DECODING MOTION INFORMATION

This application claims the benefit, under 35 U.S.C. § 371 of International Application No. PCT/EP17/084586, filed Dec. 26, 2017, which was published on Dec. 7, 2018, which claims the benefit of European Patent Application No. EP17305002.2 filed Jan. 3, 2017.

TECHNICAL FIELD

The present embodiments generally relate to a method and an apparatus for video encoding and decoding, and more particularly, to a method and an apparatus for encoding and decoding motion information.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized and entropy coded. To reconstruct the video, the compressed data is decoded by inverse processes corresponding to the prediction, transform, quantization and entropy coding.

SUMMARY

According to a general aspect of the present principles, a method for video decoding is presented, comprising: determining, at the decoder, a list of motion vector candidates for a block in a picture for decoding of the block, wherein the motion vector candidates in the list of motion vector candidates for the block are not explicitly signaled by an encoder but are derived at the decoder; reordering, at the decoder, the determined list of motion vector candidates for the block based on a criterion; determining, at the decoder, a motion vector for the block based on the reordered list of motion vector candidates; and decoding, at the decoder, the block based on the determined motion vector.

According to another general aspect of the present principles, a method for video encoding is presented, comprising: determining, at the encoder, a list of motion vector candidates for a block in a picture for decoding of the block, wherein the motion vector candidates in the list of motion vector candidates for the block are not explicitly signaled by the encoder but are to be derived at a decoder; reordering, at the encoder, the determined list of motion vector candidates for the block based on a criterion; determining, at the encoder, a motion vector for the block based on the reordered list of motion vector candidates; and encoding, at the encoder, the block based on the determined motion vector.

According to another general aspect of the present principles, an apparatus for video decoding is presented, comprising: means for determining a list of motion vector candidates for a block in a picture for decoding of the block, wherein the motion vector candidates in the list of motion vector candidates for the block are not explicitly signaled by an encoder but are derived at a decoder; means for reordering the determined list of motion vector candidates for the block based on a criterion; means for determining a motion vector for the block based on the reordered list of motion vector candidates; and means for decoding the block based on the determined motion vector.

According to another general aspect of the present principles, an apparatus for video encoding, comprising: means for determining a list of motion vector candidates for a block in a picture for decoding of the block, wherein the motion vector candidates in the list of motion vector candidates for the block are not explicitly signaled by the encoder, but are to be derived at a decoder; means for reordering the determined list of motion vector candidates for the block based on a criterion; means for determining a motion vector for the block based on the reordered list of motion vector candidates; and means for encoding the block based on the determined motion vector.

In one exemplary embodiment, the criterion may be based on one or more previously determined motion vector candidate lists of one or more previously encoded or decoded blocks. In another exemplary embodiment, the criterion may be based on statistics of previously determined motion vector candidates. The determined list of motion vector candidates for the block may be reordered based on the statistics into a reordered list of motion vector candidates from smaller to larger motion vectors, or the one or more of the determined motion candidates in the determined list of motion vector candidates for the block may be removed based on the statistics, e.g., when the statistics indicating that small or large motion vector candidates are not likely to be selected to be included in the initial list.

In another exemplary embodiment, a mode indicating the reordering may be signaled by the encoder to the decoder. In another exemplary embodiment, the block may be a merge block in e.g., HEVC, or the block may be a sub-block of a merge block. The list of motion vector candidates for the block may be determined in a Frame Rate Up-Conversion (FRUC) derivation process. The motion vector for the block may be determined based on a matching cost of the motion vector. The motion vector for the block may be determined in a FRUC template mode or the motion vector for the block may be determined in a FRUC bilateral mode.

According to another general aspect of the present principles, a video signal formatted to include encoded data representative of a block of a picture is provided, wherein the encoded data is formatted by: determining a list of motion vector candidates for a block in a picture for decoding of the block, wherein the motion vector candidates in the list of motion vector candidates for the block are not explicitly signaled by the encoder to a decoder, but are to be derived at a decoder; reordering the determined list of motion vector candidates for the block based on a criterion; determining a motion vector for the block based on the reordered list of motion vector candidates; and encoding the block based on the determined motion vector.

The present embodiments also provide a computer readable storage medium having stored thereon instructions for encoding or decoding video data according to the methods described above. The present embodiments also provide a computer readable storage medium having stored thereon a bitstream generated according to the methods described above. The present embodiments also provide an apparatus for transmitting the bitstream generated according to the methods described above.

BRIEF DESCRIPTION OF THE DRAWINGS

FIG. 1 illustrates a block diagram of an exemplary HEVC (High Efficiency Video Coding) video encoder.

FIG. 2A is a pictorial example depicting the positions of five spatial candidates $\{a_1, b_1, b_0, a_0, b_2\}$ for a current block, and FIG. 2B is a pictorial example depicting an exemplary motion vector representation using AMVP (Advanced Motion Vector Prediction).

FIG. 5A, FIG. 5B and FIG. 5C illustrate using a bilateral mode to derive motion information for a current "merge" block.

DETAILED DESCRIPTION

Figure 3:
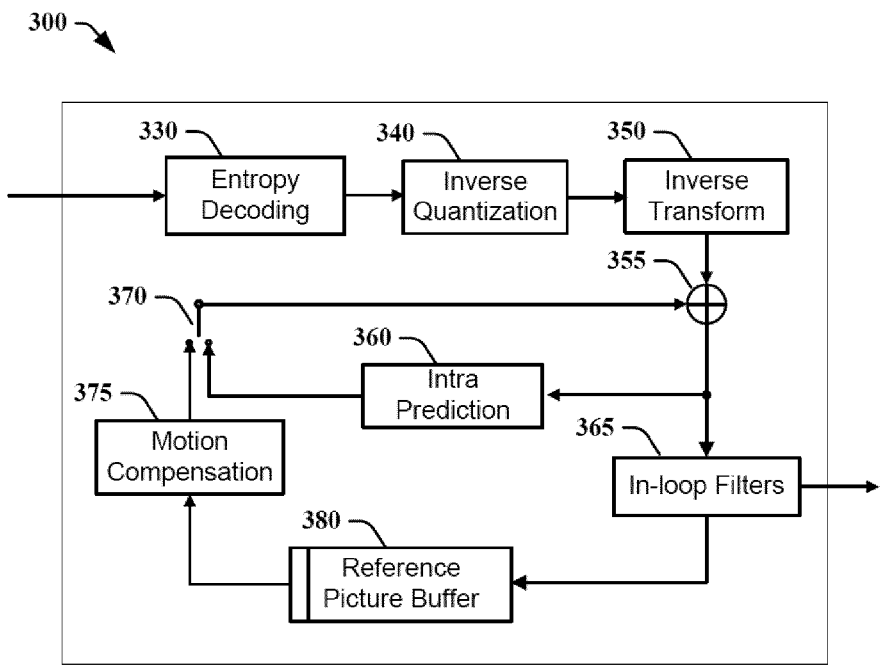
FIG. 3 illustrates a block diagram of an exemplary HEVC video decoder.

FIG. 1 illustrates an exemplary HEVC encoder 100. To encode a video sequence with one or more pictures, a picture is partitioned into one or more slices where each slice can include one or more slice segments. A slice segment is organized into coding units, prediction units and transform units.

In the present application, the terms "reconstructed" and "decoded" may be used interchangeably, and the terms "picture" and "frame" may be used interchangeably. Usually but not necessarily the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar and 33 angular prediction modes. The intra prediction reference is reconstructed from the row and column adjacent to the current block. The reference extends over two times the block size in horizontal and vertical direction using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (i.e., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

The set of possible candidates in the merge mode consists of spatial neighbor candidates, a temporal candidate, and generated candidates. FIG. 2A shows the positions of five spatial candidates $\{a_1, b_1, b_0, a_0, b_2\}$ for a current block 210, wherein $a_0$ and $a_1$ are to the left of the current block, and $b_1$, $b_0$, $b_2$ are at the top of the current block. For each candidate position, the availability is checked according to the order of $a_1, b_1, b_0, a_0, b_2$, and then the redundancy in candidates is removed.

The motion vector of the collocated location in a reference picture is used for derivation of the temporal candidate. The applicable reference picture is selected on a slice basis and indicated in the slice header, and the reference index for the temporal candidate is always set to $i_{ref}=0$. If the POC distance (td) between the picture of the collocated PU and the reference picture from which the collocated PU is predicted from, is the same as the distance (tb) between the current picture and the reference picture containing the collocated PU, the collocated motion vector $mv_{col}$ can be directly used as the temporal candidate. Otherwise, a scaled motion vector, $tb/td*mv_{col}$, is used as the temporal candidate. Depending on where the current PU is located, the collocated PU is determined by the sample location at the bottom-right or at the center of the current PU.

The maximum number of merge candidates N is specified in the slice header. If the number of merge candidates is larger than N, only the first N−1 spatial candidates and the temporal candidate are used. Otherwise, if the number of merge candidates is less than N, the set of candidates is filled up to the maximum number N with generated candidates as combinations of already present candidates, or null candidates. The candidates used in the merge mode may be referred to as "merge candidates" in the present application.

If a CU indicates a skip mode, the applicable index for the merge candidate is indicated only if the list of merge candidates is larger than 1, and no further information is coded for the CU. In the skip mode, the motion vector is applied without a residual update.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

Only two spatial motion candidates are chosen in AMVP. The first spatial motion candidate is chosen from left positions $\{a_0, a_1\}$ and the second one from the above positions $\{b_0, b_1, b_2\}$, while keeping the searching order as indicated in the two sets. If the number of motion vector candidates is not equal to two, the temporal MV candidate can be included. If the set of candidates is still not fully filled, then zero motion vectors are used.

If the reference picture index of a spatial candidate corresponds to the reference picture index for the current PU (i.e., using the same reference picture index or both using long-term reference pictures, independently of the reference picture list), the spatial candidate motion vector is used directly. Otherwise, if both reference pictures are short-term ones, the candidate motion vector is scaled according to the distance (tb) between the current picture and the reference picture of the current PU and the distance (td) between the current picture and the reference picture of the spatial candidate. The candidates used in the AMVP mode may be referred to as "AMVP candidates" in the present application.

For ease of notation, a block tested with the "merge" mode at the encoder side or a block decoded with the "merge" mode at the decoder side is denoted as a "merge" block, and a block tested with the AMVP mode at the encoder side or a block decoded with the AMVP mode at the decoder side is denoted as an "AMVP" block.

FIG. 2B illustrates an exemplary motion vector representation using AMVP. For a current block (240) to be encoded, a motion vector ($MV_{current}$) can be obtained through motion estimation. Using the motion vector ($MV_{left}$) from a left block (230) and the motion vector ($MV_{above}$) from the above block (220), a motion vector predictor can be chosen from $MV_{left}$ and $MV_{above}$ as $MVP_{current}$. A motion vector difference then can be calculated as $MVD_{current} = MV_{current} - MVP_{current}$.

Motion compensation prediction can be performed using one or two reference pictures for prediction. In P slices, only a single prediction reference can be used for inter prediction, enabling uni-prediction for a prediction block. In B slices, two reference picture lists are available, and uni-prediction or bi-prediction can be used. In bi-prediction, one reference picture from each of the reference picture lists is used.

In HEVC, the precision of the motion information for motion compensation is one quarter-sample (also referred to as quarter-pel or ¼-pel) for the luma component and one eighth-sample (also referred to as ⅛-pel) for the chroma components for 4:2:0 configuration. A 7-tap or 8-tap interpolation filter is used for interpolation of fractional-sample positions, i.e., ¼, ½ and ¾ of full sample locations in both horizontal and vertical directions can be addressed for luma.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

FIG. 3 illustrates a block diagram of an exemplary HEVC video decoder 300. In the exemplary decoder 300, a bitstream is decoded by the decoder elements as described below. Video decoder 300 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above, AMVP and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

A Frame Rate Up-Conversion (FRUC) mode or derivation, based on frame rate up-conversion techniques, is developed in the reference software JEM (Joint Exploration Model) by the Joint Video Exploration Team (JVET). With the FRUC mode, motion information of a block is derived at the decoder side without explicit syntax for MVP information. The FRUC process is completely symmetric, i.e., the same motion derivation operations are performed, at the encoder and the decoder.

Two methods, namely, bilateral matching and template matching, can be used in the FRUC mode in JEM. In particular, for a "merge" block, both bilateral matching and template matching can be used, and for an "AMVP" block, only template matching can be used. In HEVC, the "merge" block or "AMVP" block corresponds to a PB on which the same prediction is applied.

For the merge mode, the use of the FRUC-based decoder side motion vector derivation for a given block can be signaled through a dedicated flag in the bitstream. There is a SPS flag indicating if the FRUC mode can be used for a "merge" block, and a FRUC flag indicating if FRUC is locally used for the block. If FRUC is locally used, the FRUC merge mode is used, otherwise the HEVC merge mode is used. In the FRUC merge mode, the motion vector for the block is derived at the decoder without explicit syntax for motion information, and similarly to the HEVC merge mode, no MVD is used. When the FRUC merge mode is used, an additional FRUC mode flag is signaled to indicate which mode (bilateral mode for bilateral matching, or template mode for template matching) is used to derive motion information for the block.

For the AMVP mode, if the SPS flag allows the FRUC mode, then an "AMVP" block attempts to derive a motion vector as a FRUC candidate in the template mode and puts the FRUC candidate as the first one in the AMVP list of candidates. At the decoder side, a motion vector difference (MVD) is decoded and a motion vector predictor (MVP) is identified from the AMVP list, then the motion vector is decoded as MV=MVP+MVD.

Figure 4:
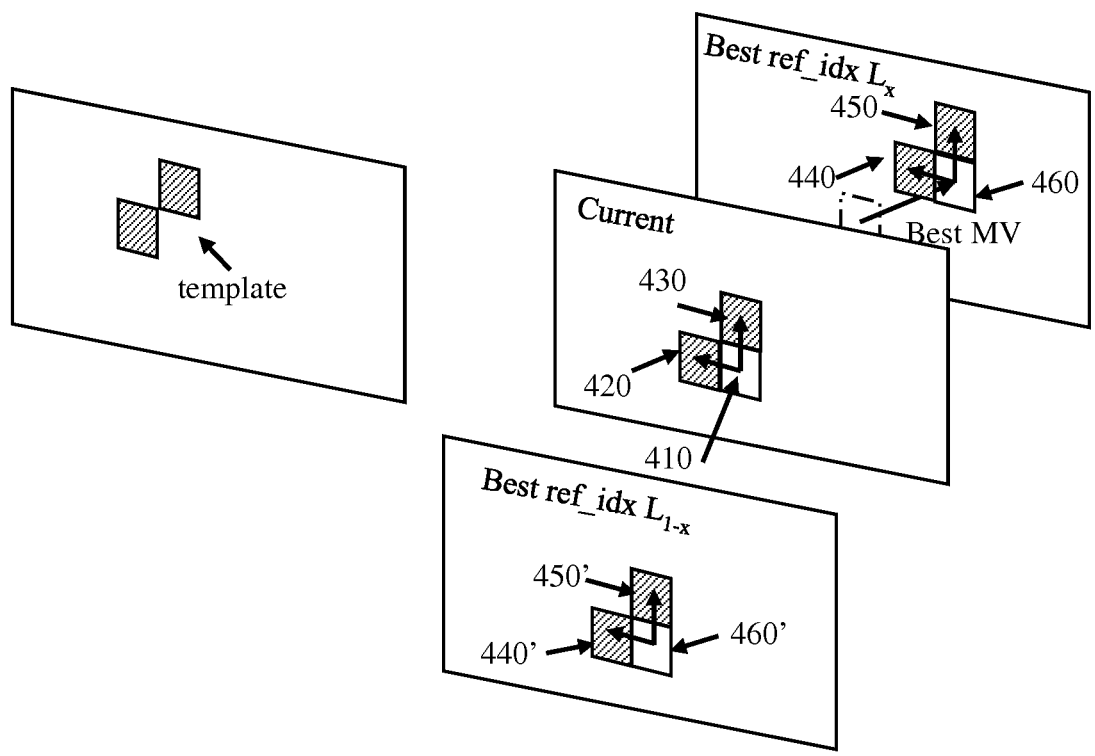
FIG. 4 illustrates using a template mode to derive motion information for a current block.

FIG. 4 illustrates using the template mode to derive motion information for a current block 410. The current block may be in the "merge" or "AMVP" mode. Top and left neighboring blocks of the current block are used as a template. The motion information can be derived by locating the best match between the template (420, 430) of the current block and the template (440, 450) of a block in the reference picture by locating the block (460) with the smallest matching cost, for example, with the smallest SAD (Sum of Absolute Differences) between the templates. Other cost measures than SAD can also be used for calculating the matching cost. In particular, the motion vector can be obtained as the displacement between a collocated block of the current block and the best matching block.

In HEVC, a bi-predictive (B) slice is a slice that may be decoded with intra prediction or inter prediction using at most two motion vectors and two reference indices to predict the sample values of each block. This bi-predictive (B) block concept is also illustrated in FIG. 4 with another set of template (440', 450') having another reference block (460') in the opposite direction of the other reference block (460). Also, as illustrated in FIG. 4, one of the reference blocks (460) appears in the reference index list 0 and the other of the reference blocks (460') appears in the other reference index list 1 or vice versa.

FIG. 5A illustrates using the bilateral mode to derive motion information for a current "merge" block 510. Two reference lists are used for the bilateral mode, and thus the bilateral mode is only valid for B frames. Under the assumption of continuous motion trajectory, two blocks (520, 530) along the motion trajectory of the current block (510) are used to derive motion information of the current block.

Here a pair of reference pictures are used, one from list 0 (L0) and the other one from list 1 (L1). From each pair of reference pictures, two different predictors can be constructed: (i) using the motion vector from L0 and a scaled version in L1, or (ii) using the motion vector from L1 and a scaled version in L0. For ease of notation, we denote the reference picture list as a "major" list from which the motion vector is chosen, and the other list as a "secondary" list where a scaled version is used.

When the reference pictures are symmetric with respect to the current picture as shown in FIG. 5A, the scaling factor is reduced to −1. If no symmetric pictures with respect to the current picture are available, then the closest reference picture to the current picture in the second list is selected. The reference picture "ref_idx $L_{1-x}$" can move closer to the current picture as shown in FIG. 5B, or even go to the other side of the current picture as shown in FIG. 5C.

The motion information can be derived by locating the pair of blocks in the two different reference pictures with the smallest matching cost, for example, with the smallest SAD between these two blocks. In particular, the motion vector can be obtained as the displacement between a collocated block (550) of the current block and the matching block (530) in the majority list. Here, the pair of blocks (520, 530) may also be considered as the templates for collocated blocks (540, 550) in the reference pictures, respectively.

Figure 6:
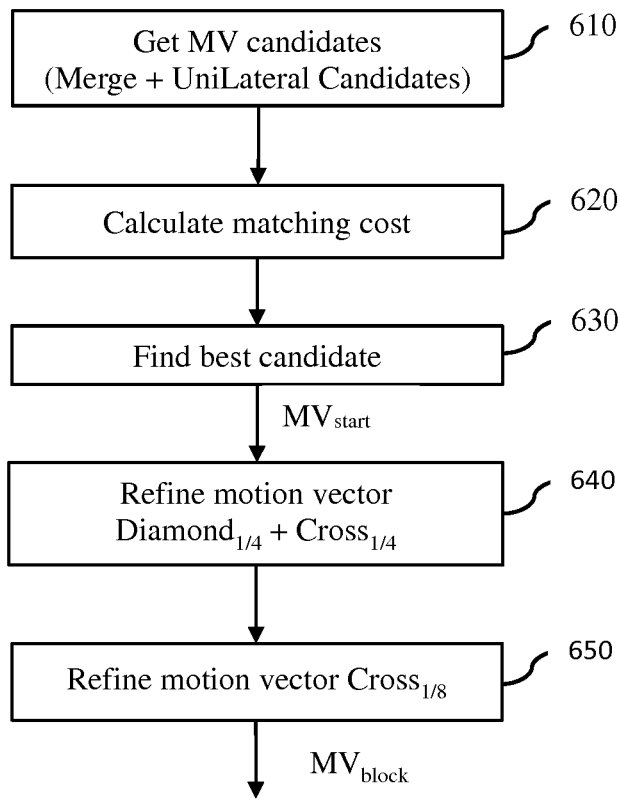
FIG. 6 illustrates an exemplary method for implementing the FRUC (Frame Rate Up-Conversion) tool or derivation.

FIG. 6 illustrates an exemplary method 600 for implementing the FRUC tool. Method 600 can be used for a "merge" block or an "AMVP" block. For an inter block in the FRUC mode, a list of motion vector candidates are derived (610). A motion vector candidate for the FRUC mode may be referred to as a FRUC candidate, and the list of motion vector candidates for the FRUC mode may be referred to as a FRUC list or a list of FRUC candidates. It should be noted that the list of FRUC candidates contains unique motion vectors, that is, redundant motion vectors are removed from the FRUC list and the motion vectors in the FRUC list are different from each other. During the motion derivation process, the list of FRUC candidates is checked (620) through a matching cost that depends on the mode used (template mode or bilateral mode), and the first candidate that leads to the minimum matching cost is selected (630) as the starting point ($MV_{start}$) for refinement.

Since the bilateral mode uses both lists with one major list and another list derived from the major list with a scaled version of the motion vector, obtaining the best candidate with the minimum cost also defines the best list to be used (i.e., the major one). Subsequently, further operations are performed, for the best identified list in the bilateral mode.

In the template mode, the reference picture is selected at the encoder and indicated in the bitstream. For example, one best candidate is obtained for each reference picture list (list 0 for a P picture, list 0 and list 1 for B pictures). Subsequently, further operations are performed for the best reference picture list if there is only 1 list, or one list after another (list 0 followed by list 1) if there are 2 lists. At the decode side, the reference picture information is decoded from the bitstream.

Then a local search based on the same matching cost function (template mode or bilateral mode) around the starting point ($MV_{start}$) is performed and the MV resulting in the minimum matching cost is chosen as the MV ($MV_{block}$) for the block.

FRUC Merge Mode

For a "merge" block using the FRUC mode, the list of motion vector candidates includes unique motion vectors from:

The spatial, temporal, and/or zero motion vectors as discussed above for the merge mode in HEVC;

Unilateral motion vectors. For a block, in each possible reference picture from L0 (and L1), we may choose the collocated motion vectors and scale each of them with a ratio of the distances (tb) between current picture and the reference picture of the current block (namely, the picture with the collocated motion vector), to the distance (td) between the collocated picture and the reference picture of the collocated block, similar to the derivation process of a temporal motion vector candidate. The scaled motion vectors are called unilateral motion vectors. The scaling may be skipped if the ratio of tb to td is 1. The collocated block may be determined CTU by CTU. For the current block (merge or AMVP), collocated blocks may be determined by sample locations at (0, 0), (0, H/2), (W/2, 0) and (W/2, H/2) with respect to the current block, where H is the height of the current block, and W is the width of current block. For sub-blocks, the collocated sub-blocks are determined by the sample location at (0, 0) with respect to the current sub-block.

Figure 7:
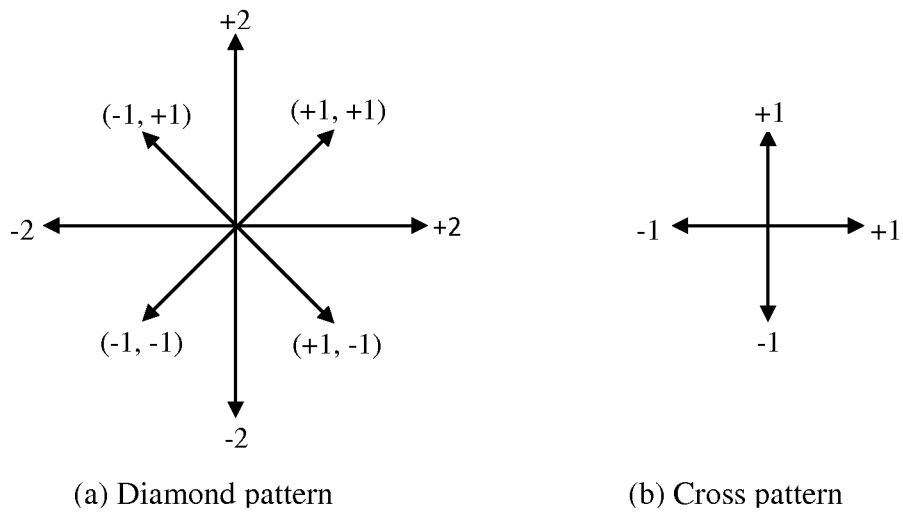
FIG. 7 shows a diamond pattern and a cross patter for motion search.

The refinement of the motion information using the best candidate ($MV_{start}$) for the block as the starting point is performed in several steps. One step attempts to adjust (640) the motion vector at the current accuracy, i.e., search with a diamond pattern as shown in FIG. 7(*a*), at ¼-pel precision. Each vector in FIG. 7(*a*) represents a small delta value (i.e., refinement vector), at a certain precision, to be added to the motion vector in order to refine the motion vector.

The refinement vector is added (640) to the candidate and the new cost is calculated as the sum of the motion vector cost (a multiple M of the sum of absolute differences in x and y between the initial best candidate ($MV_{start}$) and the current tested motion vector, where M is a predefined factor used in FRUC, for example, M=4) and the associated matching cost. The motion vector cost as used here is to maintain the final refined motion vector to be as close to that of the not yet refined selected motion vector with the minimum matching cost.

If one of the tested new motion vector has a cost lower than the current best cost, the new motion vector is defined as the new best candidate, and the associated new cost is stored as the new best cost. After all points in the diamond pattern are tested, the best candidate, if changed, is used as a new starting point, and will go through the adjustment recursively using the diamond pattern until no new best candidate can be found (i.e., no new lower cost).

Then one single step is performed (640) at ¼-pel accuracy, using the cross pattern as shown in FIG. 7(*b*). Finally, a last single step (650) using also the cross pattern is done at ⅛-pel accuracy if the internal precision is finer than ¼-pel. Here the internal precision is the precision of motion compensation which is able to interpolate fractional-sample positions up to ¹⁄₁₆, ¹⁄₃₂, or even higher.

As an example, we assume that the initial best candidate ($MV_{start}$) selected at step 630 is (−3.3750, 1.0000) with a matching cost of 283. The first refinement uses the diamond pattern refinement at ¼-pel accuracy recursively, until no new candidate with a lower cost could be found:
- −2 in x, i.e. (−3.8750, 1.0000) with a cost of 275 (with a MV cost=0.5000*M),
- −2 in x, i.e. (−4.3750, 1.0000) with a cost of 270 (with a MV cost=1.0000*M),
- −2 in x, i.e. (−4.8750, 1.0000) with a cost of 255 (with a MV cost=1.5000*M),
- (−1, +1), i.e. (−5.1250, 1.2500) with a cost of 253 (with a MV cost=2.0000*M).

Then a single step is done at ¼-pel accuracy, using the cross pattern:
- +1 in y, i.e. (−5.1250, 1.5000) with a cost of 250 (with a MV cost=2.2500*M).

For an internal precision finer than ¼-pel, a last single step using the cross pattern is achieved at ⅛-pel accuracy as:
- +1 in y, i.e. (−5.1250, 1.6250) with a cost of 244 (with a MV cost=2.3750*M).

Figure 8:
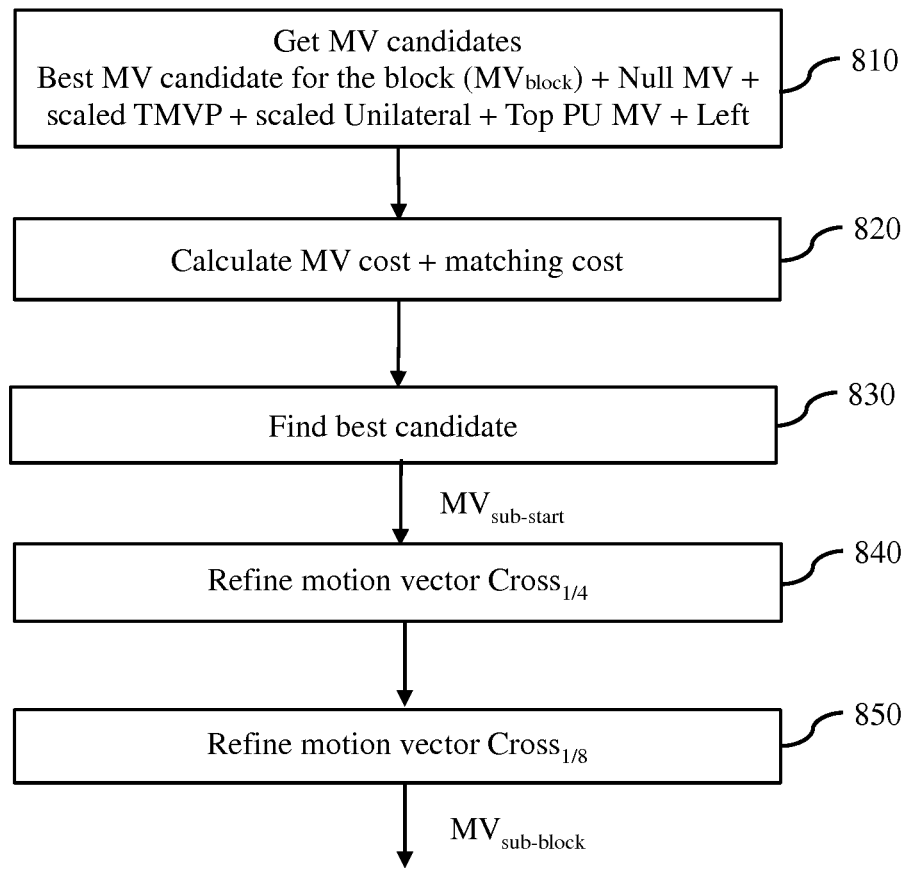
FIG. 8 shows a method for refining motion information at the sub-block level for a "merge" block in the FRUC derivation tool.

For a "merge" block, the motion information is further refined at the sub-block level with the derived motion vector ($MV_{block}$) for the block as the starting point as shown in FIG. 8 as method 800. The refinement at the sub-block level is performed for the reference picture where the refined motion vector ($MV_{block}$) is selected from.

Particularly, in the bilateral mode, the sub-block level refinement is performed with respect to the selected reference picture in the selected list. In the template mode, the sub-block level refinement is performed with respect to the selected reference picture if there is one reference picture list, and if two reference picture lists are available, the sub-block level refinement is performed with respect to the selected reference pictures in both lists. Thus, in both the bilateral and template modes, all sub-blocks use the same reference list and same reference picture index as the list ($list_{block}$) and reference picture index ($ref_{block}$) obtained for the entire block. Note that in order to distinguish the term "block" from its associated sub-blocks, we also refer to the "block" as the "entire block."

To perform the sub-block refinement, a block is divided into smaller blocks (i.e., sub-blocks) having a size of at least 4×4 pixels. For each of the sub-blocks, a new similar process as for the initial block (i.e., the entire block) is performed.

The main differences between sub-block refinement (800) and the initial block processing (600) stand in the list of FRUC candidates. For the sub-block level refinement, the FRUC list (810) contains unique motion vectors from:
  i. the best candidate of the initial block ($MV_{block}$)
  ii. a null motion vector
  iii. scaled TMVP (temporal MVP) as the scaled version of the collocated motion vector, and the scaled version of the motion vector at the bottom-right of the collocated sub-block
  iv. scaled version of the "unilateral" candidate based on the sub-block. It should be noted that unilateral motion vectors are already scaled by the ratio of the distance between the current picture and the collocated picture to the distance between the collocated picture and the reference picture of the collocated picture. Here for sub-blocks, reference picture is fixed to the one of the entire block ($MV_{block}$), and unilateral motion vectors are scaled a second time by a ratio of the distance (tb) between the current picture and the reference picture to the distance (td) between the current picture and the collocated picture. The second scaling allows getting a global scaling based on the ratio of tb to td because the current reference picture is not the same as the collocated picture.
  v. top and left neighboring motion vectors (bi and $a_1$) if using the same reference picture as the current sub-block (or as the initial block since all sub-blocks use the reference picture selected for the initial block).

The matching cost for each of these candidates is computed and added (820) to the motion vector costs (a multiple M of the sum of absolute differences in x and y between the initial best candidate ($MV_{block}$) and the current tested candidate), in order to obtain (830) the first candidate encountered with the minimum cost as the best candidate to be refined.

Finally, the best candidate ($MV_{sub,start}$) for a sub-block is refined in a similar way as for the entire block. The refinement is performed using (840) the cross pattern recursively at ¼-pel accuracy until no new best cost (as the sum of the motion vector cost and the matching cost) could be found, followed by a single step (850) using the cross pattern at ⅛-pel accuracy if the internal precision is finer than ¼-pel. The output of method 800 is the motion vector ($MV_{sub-block}$) for a sub-block in the FRUC merge mode. Method 800 is performed at both the encoder and decoder side. Motion vector $MV_{sub-block}$ is used as the motion vector for encoding or decoding the sub-block in the FRUC merge mode, without the need to encode or decode explicit syntax for motion information.

FRUC AMVP Mode

The FRUC mode for an AMVP block proceeds in a similar manner as for a "merge" block, without the refinement at the sub-block level. The FRUC candidates are also based on the spatial, temporal, and/or zero motion vectors as discussed above for the merge mode in HEVC, and unilateral motion vectors. However, the processes are somewhat different between a merge block and an AMVP block for FRUC.

In the HEVC merge mode, at both the encoder and decoder sides, only one list of FRUC candidates is constructed with vectors, using any reference picture from any reference picture list, then the selected FRUC candidate defines also the list and the reference picture (reference picture information is not transmitted in the bitstream).

In the HEVC AMVP mode, a reference picture (and a reference picture list if in a B picture) is selected at the encoder side, for example, by testing each available reference picture and each reference list. In one example, for a B picture, when there are 5 reference pictures in L0 and 2 reference pictures in L1, 7 FRUC lists are constructed, and 7 best vectors are obtained, then the best among the 7 best vectors is selected. The reference picture information is indicated to the decoder in the bitstream for the AMVP mode. At the decoder side, one list of FRUC candidates is constructed for the selected reference picture.

When the FRUC tool is implemented in the AMVP block, a FRUC candidate can be added and inserted as the first candidate. An initial FRUC list is the same as for merge blocks (merge+unilateral) but only motion vector candidates corresponding to the selected reference picture are kept. The first one ($MV_{start}$) in the initial FRUC list with the minimum cost defines the best candidate for refinement. After refinement, the FRUC candidate ($MV_{block}$) is added to the AMVP candidate list.

Particularly, the best candidate ($MV_{start}$) is refined (640) recursively at ¼-pel accuracy with the diamond pattern. Then a single refinement step (640) at ¼-pel accuracy with the cross pattern is performed, which is followed by a final single step (650) at ⅛-pel accuracy with the cross pattern if the internal precision is finer than ¼-pel. The output ($MV_{block}$) from the refinement is used as the first candidate in the AMVP list. If the first candidate (i.e., the FRUC candidate) is chosen for a block, at the encoder side, an associated MVD and reference picture index are encoded. At the decoder side, the FRUC candidate ($MV_{block}$) is derived symmetrical to the encoder, and the motion vector for decoding the block is obtained based on the associated MVD and the decoded reference picture index.

As noted before, in the existing FRUC tool, there are two different processes for finding potential motion vector candidates, for example, one for the entire merge blocks as illustrated in FIG. 6, and one for the sub-blocks of the merge blocks as illustrated in FIG. 8. These processes are similar, as described previously. Basically, an initial list (or two lists for bi-predictive (B) pictures) of motion vector predictor candidates is constructed. Then, the matching cost of each candidate is calculated in order to isolate the best candidate as the first determined candidate that has the lowest matching cost. This best candidate is finally refined towards the minimum reachable cost, again as shown and described previously in connection with FIG. 6 and FIG. 8.

Also as already described previously, one main difference between the two different processes of FIG. 6 and FIG. 8 is the difference in the respective predefined or predetermined lists of the unique motion vector candidates corresponding to the two different processes:

For the process of the entire merge block as illustrated in FIG. 6, the determined order of the initial list of motion vector candidates is as follows: (i) all unique motion vectors candidates of the merge block and (ii) all unique "uni-lateral" motion vectors.

For the process for the sub-block of a merge block as illustrated in FIG. 8, the determined order of the initial list of motion vector candidates is as follows: (i) the best refined motion vector candidate of the whole merge block as determined in, e.g., the process of FIG. 6, (ii) a null motion vector, (iii) scaled motion vectors of the collocated and bottom-right collocated blocks associated with the sub-block, (iv) scaled "uni-lateral" motion vector, and (v) top and left neighboring motion vectors if using the same reference picture.

Again, as already mentioned before, in FRUC, the motion vector candidates in the list(s) of motion vector candidates for the block or sub-block are not explicitly signaled by an encoder, but are derived at the decoder based on the respective predetermined orders as described above. Accordingly, the present principles recognize that the existing FRUC derivation process may be improved and its complexity reduced by reordering the initial predetermined candidates, and/or by removing one or more candidates from the predetermined FRUC list before any calculation. The goal is therefore to move and/or remove some candidates from the ordered candidate list(s) based on some criteria that may be predefined globally or locally to generate an adaptive list. For ease of notation, we may sometimes also refer to the moving or removing of candidates in the candidate list(s) as "reordering" of motion vector candidates. In accordance with an exemplary embodiment of the present principles, the adaptive list may be generated both at the encoder and the decoder, also without the need for the explicitly signaling by the encoder to indicate to the decoder the modified motion vector candidates in the adaptive list.

According to the present principles, different possible criteria allowing the reordering of the motion vector candidates are presented. For example, the criterion may be based on statistics, such as, e.g., a probability of each of the previously determined candidates to be selected or to be present respectively in the list adaptively determined during the encoding or decoding process. It may be based on some measurements such as, for example, one or more of the following: the respective matching cost in FRUC, the energy of the prediction (for example, the sum of absolute luminance values of the prediction block, or another measurement preformed on the prediction blocks), the norm of the motion vector. Consequently, the list of FRUC candidates becomes adaptive to the video sequence.

In one exemplary embodiment, this adaptive mode may be signaled by the encoder so that the adaptation of the previously determined list of motion candidates may be started concurrently in both the encoder and the decoder in order to synchronize the encoding and decoding processes. This would also allow the exemplary adaptive mode to be turned on and off in one exemplary embodiment based on collected statistics according to the present principles. For example, the encoder can test both on/off modes, then signals the choice of on or off to decoder. In another example, the on or off mode can be deduced, for instance, if the difference between neighboring MVs is small, then uses it at ON (i.e., use the adaptive mode), otherwise uses it OFF.

Furthermore, an exemplary criterion may be evaluated at different levels of the video pictures, such as, e.g., at an entire block level or at a sub-block level. That is, an exemplary criterion may be based on statistics which are obtained for a large set of video sequences, such as a frame or a slice, in order to reorder a previously defined candidate order in the previously determined list. The reordering may be preceded or followed by the removal of one or more of the previously determined candidates. In another exemplary aspect according to the present principles, the exemplary criterion may be based on statistics specific to only a block or sub-block.

In another exemplary embodiment, the reordering criterion may be based on, for example, measurements or statistics on one or several previously encoded/decoded sub-blocks, blocks, CU(s), CTU(s), and/or picture(s) where the measurements or statistics are based on the previously encoded/decoded neighbors, and not the current ones being encoded/decoded. In accordance with the present principles, therefore, it is possible to reorder the candidates in the predetermined lists to improve the efficiency of the existing FRUC derivation process based on statistics, for example, by racking previously determined motion vector candidate lists of previously encoded/decoded blocks.

Furthermore, in an exemplary embodiment according to the present principles, statistics collected over a large set of video sequences may show, for example, that the previously determined top neighboring candidates are more often selected than the left neighboring ones, and that the top-left neighboring ones are not often selected in the large set of the video sequences. Thus, it would be advantageous and more efficient to shift the top candidates to the beginning of the list ahead of the other candidates, remove the top-left candidates from the list, and/or move the top-left candidates to the bottom of the list. In another non-limiting exemplary embodiment according to the present principles, for previously encoded/decoded blocks or frames, neighboring the current one, if the most selected candidate has become the bottom-right co-located one, then it may be advantageous to adjust the predetermined list for the current block or frame so as to begin with the bottom-right co-located candidates instead. Furthermore, for a particular CU, if none of the neighboring previously encoded/decoded CUs use the sub-PU temporal candidates, then it may be advantageous to locally remove such candidates from the Merge list of this CU.

In another exemplary embodiment according to the present principles, statistics collected over a large set of sequences may show that the often selected motion vector candidates are those with the smaller motion vectors and/or that motion vectors which are larger than a value S are never selected. For those video sequences, it is advantageous to reorder the predetermined list in the order from the smaller to the larger motion vectors, and/or to remove candidates with motion vector larger than S. In another exemplary embodiment according to the present principles, for previously encoded/decoded frames, neighboring the current one, if the most selected candidate has become the one with a motion vector whose norm is close to a particular value T, then it is possible to reorder the lists for the current frame so as to begin with candidates whose norm is close to T. In another exemplary embodiment, for a particular CU, if all the neighboring previously encoded/decoded CUs use the candidate with the larger norm, then it is possible to reorder the candidate list such that such a candidate is at the beginning of the reorder list for this CU.

In another exemplary embodiment, modifications may be made to the FRUC process for the entire block as illustrated in FIG. 6 so that the order of the unilateral and merge candidates may be swapped, and/or the last of the 4 unilateral candidates may be removed from the list. For sub-blocks, the spatial candidates of the sub-blocks may be moved to the second position of the list, and the zero motion vector, the unilateral. When sub-PU temporal motion vector predictors (called ATMVP) are used, several ATMVP candidates may be removed from the initial FRUC lists for sub-blocks. Since the existing FRUC tool selects the first encountered candidate with the lowest cost as the best one for the further refinement, the order of these candidates in the initial FRUC lists affects which candidate may be selected as the best one. First candidates are slightly favored compared to the last ones of the lists.

Accordingly, in one exemplary embodiment, the predetermined FRUC lists for the entire merge block and the sub-blocks may be reordered into the following exemplary order according to the present principles:

For the entire block:
the 3 first "uni-lateral" motion vectors (out of the 4 AMVP ones),
the merge candidates obtained as if the block was a merge one.

For sub-blocks:
the best refined motion vector candidate of the whole block,
top and left neighboring motion vectors if using the same reference frame,
scaled motion vectors of the collocated and bottom-right collocated blocks associated with sub-blocks.

In another non-limiting exemplary embodiment according to the present principles, additional sub-PU temporal motion vector candidates may be added to the bottom of the list for the sub-blocks. In one exemplary embodiment, up to 8 additional sub-PU temporal motion vector predictor candidates may be added.

Therefore, in accordance with the present principles, since some of these candidates are not or are rarely selected, chances of such candidates being evaluated may be lessened or eliminated and therefore reducing the computational complexity of the existing derivation process. Accordingly, selected one or more candidates from the initial FRUC lists may be considered for removal and/or shifted for blocks and/or sub-blocks independently in order to improve the efficiency of the FRUC derivation process.

According to another aspect of the present principles, only some of these candidates are reordered and/or removed in order to limit the decrease of coding efficiency compared to complexity reduction. In an embodiment, for example, for AMVP and merge blocks, the number of new spatial candidates may to be limited to 2, in addition to the top and left neighboring candidates. In another exemplary embodiment, the sub-blocks of merge blocks may already use top and left spatial neighboring motion vectors if using the same reference frame as the current block. These candidates are quite often selected for sub-blocks but are set at the end of the FRUC list. It is thus interesting to add two new spatial neighbor candidates to the FRUC list (top-left and top-right ones) and to move all of them to the second place of the FRUC list.

The present principles recognize that the more complex part of the existing FRUC tool stands in the sub-block processing since the number of such sub-blocks is much larger than the entire merge blocks. Thus the complexity may be reduced by removing some candidates of the initial FRUC list for the sub-block processing such as the zero motion vector, the uni-lateral one, and/or some sub-PU temporal candidates.

Accordingly, in one exemplary embodiment according to the present principles, the lists of unique motion vector candidates are reordered to comprise the following:

For entire blocks:
only for AMVP blocks, AMVP motion vector candidates obtained as if the block was an AMVP one,
the merge candidates obtained as if the block was a merge one,
uni-lateral motion vectors,
top and left neighboring motion vectors if using the same reference picture.

For sub-blocks:
the best refined motion vector candidate of the whole block,
top, left, top-left and top-right neighboring motion vectors if using the same reference picture,
scaled motion vectors of the collocated block associated with sub-blocks,
up to 8 sub-PU temporal motion vector predictors (AMVP).

TABLE 1 shows the results of amounts of rate reductions for one exemplary embodiment reordering of predetermined candidates according to the present principles. As shown in TABLE 1, overall for the different classes of input samples, the rate reductions for Y, U, V samples are respectively 0.24%, 0.33% and 0.29% BD (Bjøntegaard-Delta) rate reductions, with almost no increase in the encoding and decoding running times (i.e., 100% and 99% respectively). Thus, the present principles may improve the compression efficiency while maintaining the computational complexity cost.

TABLE 1

| | Random Access Main 10 Over HM-16.6-JEM-4.0 (parallel) | | | | |
|---|---|---|---|---|---|
| | Y | U | V | EncT | DecT |
| Class A1 | −0.27% | −0.41% | −0.43% | 100% | 98% |
| Class A2 | −0.27% | −0.25% | −0.38% | 100% | 98% |
| Class B | −0.23% | −0.29% | −0.30% | 100% | 99% |
| Class C | −0.23% | −0.44% | −0.27% | 100% | 99% |
| Class D | −0.20% | −0.27% | −0.05% | 100% | 99% |
| Class E | | | | | |
| Overall (Ref) | −0.24% | −0.33% | −0.29% | 100% | 99% |
| Class F (optional) | −0.15% | −0.18% | −0.08% | 100% | 99% |

Figure 9:
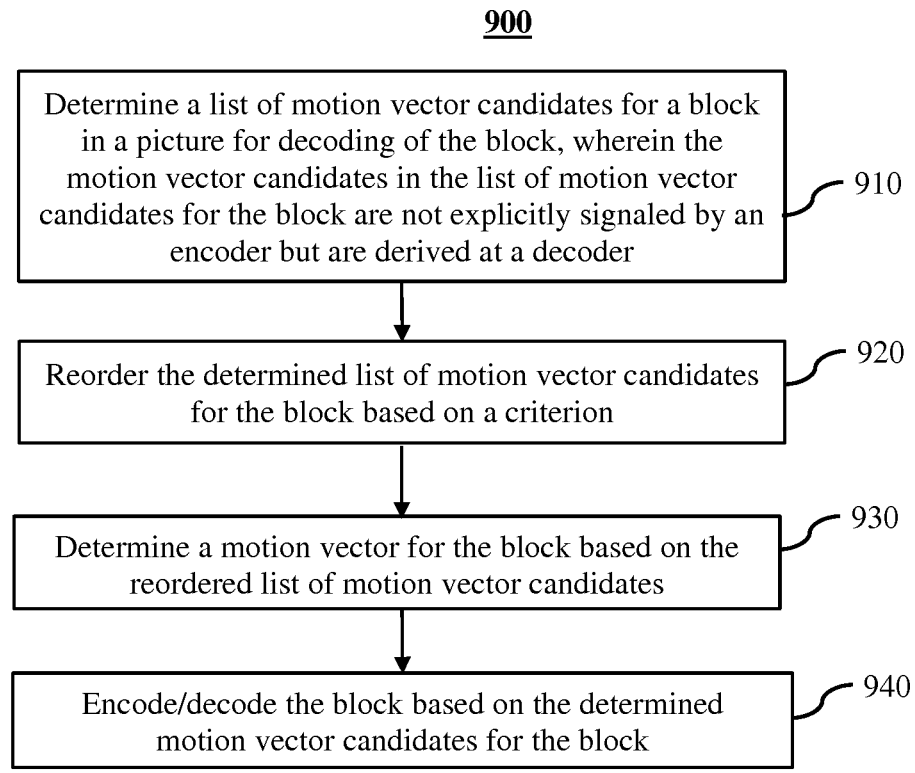
FIG. 9 shows an exemplary method of improving the existing FRUC derivation tool according to the present principles.

FIG. 9 illustrates an exemplary method 900 for improving the existing FRUC derivation tool according to an embodiment of the present principles. The exemplary method 900 may be used for encoding or decoding blocks e.g., in both AMVP mode and in merge mode of HEVC, in both template mode and bilateral mode of the FRUC derivation process, and/or for the whole block or a sub-block of the whole block. At 910, method 900 determines an initial list of motion vector candidates for a block in a picture for encoding or decoding of the block, wherein the motion vector candidates in the list of motion vector candidates for the block are not explicitly signaled by an encoder but are to be derived at the decoder side. At 920, method 900 reorders the determined list of motion vector candidates for the block based on a criterion. During the reordering, some motion vector candidates may also be removed from the list. At 930, method 900 determines a motion vector for the block based on the reordered list of motion vector candidates. At 940, the method 900 encodes/decodes the block based on the determined motion vector.

Various embodiments are described with respect to the HEVC standard or the JEM software that is under development. However, as already noted above, the present principles are not limited to HEVC or JEM, and may be applied to other standards, recommendations, and extensions thereof. Various embodiments described above may be used individually or in combination.

In the above discussions, the FRUC mode is first tested at an entire block that corresponds to a PB, and may then be applied to sub-blocks of the entire block for the merge mode. In JEM 3.0, the QTBT (Quadtree plus Binary Tree) structure removes the concept of multiple partition types in HEVC, i.e., removes the separation of CU, PU and TU concepts. In QTBT block structure, CU can have either square or rectangle shape. A Coding Tree Unit (CTU) is firstly partitioned by a quadtree structure. The quadtree leaf nodes are further partitioned by a binary tree structure. The binary tree leaf node is named as Coding Units (CUs), which is used for prediction and transform without any further partitioning. That means the CU, PU and TU have the same block size in the new coding QTBT block structure. In JEM, a CU consists of Coding Blocks (CBs) of different color components.

Thus, for JEM 3.0, the FRUC mode may be first tested at an entire block that corresponds to a CB, and may then be applied to sub-blocks of the entire block for the merge mode. More generally, the entire block for the FRUC mode may be a CB, and sub-blocks associated with the entire block are sub-partitions for the entire block. The transform may be performed at the CB level, and motion compensation may be performed at the sub-block level.

In JEM 3.0, there are several new temporal candidates in merge mode. These temporal candidates may be included into the list of FRUC candidates.

Template matching and bilateral matching are used above to describe the method of motion vector derivation, where motion information of a block is not signaled but derived at decoder side for the merge mode, and where the MVP information of a block is not signaled but derived at decoder side for the AMVP mode. In various embodiments, the templates used for template matching and bilateral matching may be different from what is shown before, and other motion derivation methods can also be used.

In some embodiments, different methods are used for an "AMVP" block and a "merge" block based on HEVC. More generally, an "AMVP" block may be considered as a block that encodes or decodes an MVD associated with a MVP (i.e., a "with MVD" block), and a "merge" block may be considered as a block that encodes or decodes the motion information without an MVD (i.e., a "without MVD" block).

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the number of iterations of refinement, the size of a minimum sub-block, or the constant M used in motion cost calculation. It should be noted that the specific values are for exemplary purposes and the present principles are not limited to these specific values.

Figure 10:
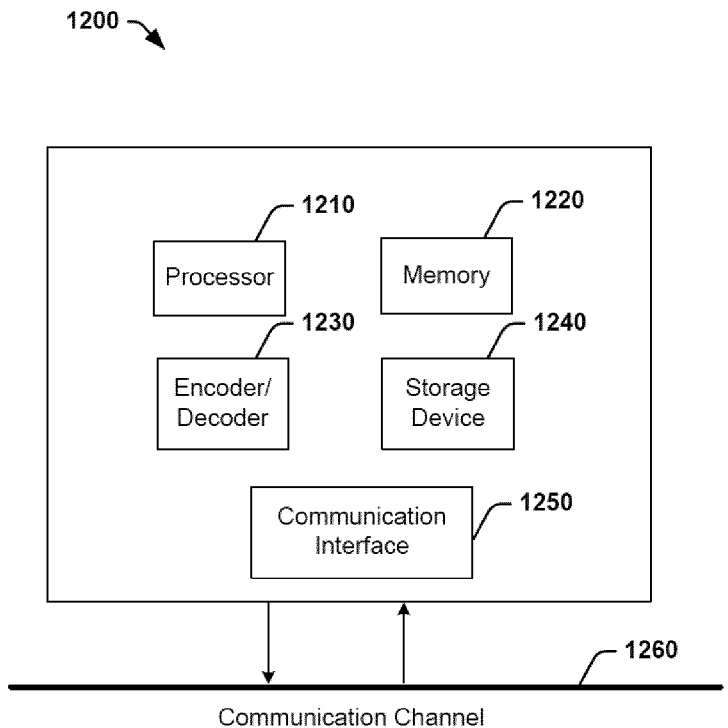
FIG. 10 illustrates a block diagram of an exemplary system in which various aspects of the exemplary embodiments of the present principles may be implemented.

FIG. 10 illustrates a block diagram of an exemplary system in which various aspects of the exemplary embodiments of the present principles may be implemented. System 1200 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1200 may be communicatively coupled to other similar systems, and to a display via a communication channel as shown in FIG. 12 and as known by those skilled in the art to implement the exemplary video system described above.

The system 1200 may include at least one processor 1210 configured to execute instructions loaded therein for implementing the various processes as discussed above. Processor 1210 may include embedded memory, input output interface and various other circuitries as known in the art. The system 1200 may also include at least one memory 1220 (e.g., a volatile memory device, a non-volatile memory device). System 1200 may additionally include a storage device 1240, which may include non-volatile memory, including, but not limited to, EEPROM, ROM, PROM, RAM, DRAM, SRAM, flash, magnetic disk drive, and/or optical disk drive. The storage device 1240 may comprise an internal storage device, an attached storage device and/or a network accessible storage device, as non-limiting examples. System 1200 may also include an encoder/decoder module 1230 configured to process data to provide an encoded video or decoded video.

Encoder/decoder module 1230 represents the module(s) that may be included in a device to perform the encoding and/or decoding functions. As is known, a device may include one or both of the encoding and decoding modules. Additionally, encoder/decoder module 1230 may be implemented as a separate element of system 1200 or may be incorporated within processors 1210 as a combination of hardware and software as known to those skilled in the art.

Program code to be loaded onto processors 1210 to perform the various processes described hereinabove may be stored in storage device 1240 and subsequently loaded onto memory 1220 for execution by processors 1210. In accordance with the exemplary embodiments of the present principles, one or more of the processor(s) 1210, memory 1220, storage device 1240 and encoder/decoder module 1230 may store one or more of the various items during the performance of the processes discussed herein above, including, but not limited to the input video, the decode video, the bitstream, equations, formula, matrices, variables, operations, and operational logic.

The system 1200 may also include communication interface 1250 that enables communication with other devices via communication channel 1260. The communication interface 1250 may include, but is not limited to a transceiver configured to transmit and receive data from communication channel 1260. The communication interface may include, but is not limited to, a modem or network card and the communication channel may be implemented within a wired and/or wireless medium. The various components of system 1200 may be connected or communicatively coupled together using various suitable connections, including, but not limited to internal buses, wires, and printed circuit boards.

The exemplary embodiments according to the present principles may be carried out by computer software implemented by the processor 1210 or by hardware, or by a combination of hardware and software. As a non-limiting example, the exemplary embodiments according to the present principles may be implemented by one or more integrated circuits. The memory 1220 may be of any type appropriate to the technical environment and may be implemented using any appropriate data storage technology, such as optical memory devices, magnetic memory devices, semiconductor-based memory devices, fixed memory and removable memory, as non-limiting examples. The processor 1210 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video encoding or decoding, comprising:
   determining a list of motion vector candidates for a block in a picture, wherein the motion vector candidates in the list of motion vector candidates for the block are not explicitly signaled in a bitstream but are to be derived at a decoder;
   adjusting an order of the determined list of motion vector candidates for the block based on magnitudes of respective motion vectors in the list of motion vector candidates, to form a reordered list of motion vector candidates, wherein the order is adjusted to begin with at least one motion vector candidate whose norm is close to a particular value;
   determining a motion vector for the block based on the reordered list of motion vector candidates;
   using the determined motion vector as a starting point for refinement, wherein a local search around the determined motion vector is performed for the refinement to form a refined motion vector; and
   encoding or decoding the block based on the refined motion vector.

2. The method of claim 1, further comprising:
   removing one or more of the determined motion vector candidates from the determined list of motion candidates for the block.

3. The method of claim 1, wherein the order is adjusted to begin with at least one motion vector candidate whose norm is close to a particular value.

4. The method of claim 1, wherein a mode indicating the adjusting is signaled by the encoder to the decoder.

5. The method of claim 1, wherein the adjusting is based on statistics of previously determined motion vector candidates.

6. The method of claim 1, wherein the determined list of motion vector candidates for the block is adjusted into a reordered list of motion vector candidates from smaller to larger magnitudes of motion vectors.

7. The method of claim 5, wherein one or more of the determined motion vector candidates in the determined list of motion vector candidates for the block are removed based on the statistics.

8. The method of claim 1, wherein the block is a merge block.

9. The method of claim 1, wherein the block is a sub-block of a merge block.

10. The method of claim 1, wherein the list of motion vector candidates for the block are determined in a Frame Rate Up-Conversion (FRUC) derivation process.

11. An apparatus for video encoding or decoding, comprising at least a processor configured to:
    determine a list of motion vector candidates for a block in a picture, wherein the motion vector candidates in the list of motion vector candidates for the block are not explicitly signaled in a bitstream but are to be derived at a decoder;
    adjust an order of the determined list of motion vector candidates for the block based on magnitudes of respective motion vectors in the list of motion vector candidates, to form a reordered list of motion vector candidates, wherein the order is adjusted to begin with at least one motion vector candidate whose norm is close to a particular value;
    determine a motion vector for the block based on the reordered list of motion vector candidates;
    use the determined motion vector as a starting point for refinement, wherein a local search around the determined motion vector is performed for the refinement to form a refined motion vector; and
    encode or decode the block based on the refined motion vector.

12. The apparatus of claim 11, wherein the at least a processor is further configured to:
    remove one or more of the determined motion vector candidates from the determined list of motion candidates for the block.

13. The apparatus of claim 11, wherein the order is adjusted to begin with at least one motion vector candidate whose norm is close to a particular value.

14. The apparatus of claim 11, wherein a mode indicating the adjusting is signaled by the encoder to the decoder.

15. The apparatus of claim 11, wherein the at least a processor is configured to adjust the order based on statistics of previously determined motion vector candidates.

16. The apparatus of claim 15, wherein one or more of the determined motion vector candidates in the determined list of motion vector candidates for the block are removed based on the statistics.

17. The apparatus of claim 11, wherein the determined list of motion vector candidates for the block is adjusted into a reordered list of motion vector candidates from smaller to larger magnitudes of motion vectors.

18. The apparatus of claim 11, wherein the block is a merge block.

19. The apparatus of claim 11, wherein the block is a sub-block of a merge block.

20. The apparatus of claim 11, wherein the list of motion vector candidates for the block are determined in a Frame Rate Up-Conversion (FRUC) derivation process.

* * * * *